United States Patent
Mäkinen

(10) Patent No.: US 6,570,933 B1
(45) Date of Patent: May 27, 2003

(54) METHOD IN DIGITAL QUADRATURE MODULATOR AND DEMODULATOR, AND DIGITAL QUADRATURE MODULATOR AND DEMODULATOR

(75) Inventor: Jarmo Mäkinen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/308,709

(22) PCT Filed: Nov. 28, 1997

(86) PCT No.: PCT/FI97/00738

§ 371 (c)(1),
(2), (4) Date: Jun. 7, 1999

(87) PCT Pub. No.: WO98/24209

PCT Pub. Date: Jun. 4, 1998

(30) Foreign Application Priority Data

Nov. 29, 1996 (FI) .................................................. 964793

(51) Int. Cl.[7] .......................... H04L 27/36; H04L 25/03
(52) U.S. Cl. ........................ 375/296; 375/324; 375/224; 375/261; 375/298
(58) Field of Search ............................... 375/224, 308, 375/261, 298, 324, 340, 296

(56) References Cited

U.S. PATENT DOCUMENTS 4,926,443 A    5/1990   Reich
5,012,208 A    4/1991   Makinen et al.
5,054,037 A   10/1991   Martineau et al.
5,442,655 A    8/1995   Dedic et al.
5,705,949 A  * 1/1998   Alelyunas et al. .......... 375/349

FOREIGN PATENT DOCUMENTS

EP    0 324 581      7/1989
WO    94/28662      12/1994

* cited by examiner

Primary Examiner—Tesfaluet Docure
Assistant Examiner—Demetria Williams
(74) Attorney, Agent, or Firm—Pillsbury Winthrop LLP

(57) ABSTRACT

Method measures imperfections in digital quadrature modulator and demodulator operation, and to a digital quadrature modulator/quadrature demodulator. The modulator includes means for modulating quadrature-phase I and Q input signals to generate an output signals to generate an output signal including quadrature-phase I and Q components; means for taking momentary amplitude samples from the output signal of the modulator at a rate based on a symbol clock of the modulator; means for classifying a direction angle of the symbol to be modulated at a particular time into a particular direction angle sector; means for linking the amplitude samples of the output signal to the direction angle sector corresponding to the symbol to be transmitted at a particular time, and means for comparing amplitudes of samples belonging to each direction angle sector with other direction angle sectors or with an ideal value for determining imperfections of the output signal of the modulator.

7 Claims, 4 Drawing Sheets

METHOD IN DIGITAL QUADRATURE MODULATOR AND DEMODULATOR, AND DIGITAL QUADRATURE MODULATOR AND DEMODULATOR

This application is the national phase of international application PCT/FI97/00738 filed Nov. 28, 1997 which designated the U.S.

BACKGROUND OF THE INVENTION

1. Field of the Invention

The invention relates to a method for measuring imperfections in a digital quadrature modulator operation in which an input signal of the modulator comprises quadrature-phase I and Q channels, whereby distortions of an output signal of the modulator from an ideal one are determined and possibly corrected during a normal operation of the modulator. The method is also suited for use in a quadrature demodulator mixer, for measuring and correcting its imperfections. The invention also relates to a digital quadrature modulator and a quadrature demodulator, the imperfections of which are determined and possibly corrected with a method of the invention.

2. Background

In quadrature modulators appear a lot of imperfections, the impact of which is difficult to remove during the normal operation of the modulator. The removing of the imperfections is problematic because the characteristics of the modulator change due to carrier wave frequency, temperature, ageing, etc., and in practice such changes cannot be compensated for without regular maintenance of the modulator being required, in addition to its original tuning.

The imperfections include the following:

A. Offset voltages appearing in the I and/or Q channels in the quadrature modulator, said voltages causing carrier wave leak into the output signal.

B. Differences in amplification and thereby differences in signal levels appear in the I and Q channels, causing distortion in a constellation generated on an I/Q plane by amplitude values of the output signal, said distortion disturbing reception.

C. Deviation from a desired 90° phase shift appears between the I and Q channels, causing crosstalk in reception between the I and Q channels and thereby disturbing reception.

D. The output power of the modulator (or the entire transmitter) can vary.

The problems are known from before and for instance the following solutions have been proposed to them:

U.S. Pat. No. 5,012,208 provides a solution to the carrier wave leak (problem A) of the quadrature modulator by a correlation, performed by analog means, of the output signal amplitude variations with signals of the I and Q channels. The apparatus in question does not, however, offer any help for solving the other problems (B, C and D).

U.S. Pat. No. 5,442,655 describes a quadrature demodulator, in which the offset voltage in the I and Q channels is measured and corrected using a two-phase procedure. In the first phase the average voltages of the I and Q channels are measured, without the time of measurement being linked to a symbol clock. The average values are then subtracted from real values and the roughly corrected values are fed into a fine correction phase. In the fine correction phase the output signals (an I/Q voltage pair) of the rough correction phase are divided into phase angle sectors on the basis of the ratio between the I and Q voltages. An average distance of signal points in a sector in relation to an axis (I or Q) is then measured from an opposite axis (Q or I) and an offset voltage is calculated as a difference of the distances in the opposite sectors. The offset voltages are then subtracted from the I and Q voltages. The publication thus describes a solution applied in a quadrature demodulator to problem A.

EP patent application 608577 A1 presents a solution, similar to the one in U.S. Pat. No. 5,012,208, to all the above mentioned problems (A, B, C, D), only its function is based on the idea that the normal operation of the modulator is interrupted for the duration of the tuning and a plurality of known test signals are run through the modulator. The apparatus in question is thus unable to correct imperfections emerging during continuous operation of the apparatus and it also requires a separate tuning to be performed in connection with the manufacturing or initialisation of the modulator.

EP patent application 0503588 A2 also describes a solution to all the above mentioned problems (A, B, C, D), only there the measurement of the modulator errors is based on two alternative implementations: (1) using specific, known test signals interrupting the normal operation, or (2) causing a slight periodic interference, separately in each adjusting parameter of the modulator, during the normal operation and examining the impact of each adjusting parameter interference on the output signal. The above solutions require either the normal operation to be interrupted or interference to be added to a normal signal, and they lead to a fairly complex implementation.

SUMMARY OF THE INVENTION

An object of the present invention is to provide a method with which in a digital quadrature modulator utilizing the method all the above mentioned problems A, B, C and D can be solved in a simple manner which can be easily, automated and made digital. This is achieved with a method of the invention characterized in that the method comprises the steps in which from an amplitude of the output signal are taken, at a rate based on a symbol clock of the modulator, numerous momentary samples;

a direction angle of a transmission signal corresponding to the samples is divided, on the basis of data bits to be transmitted or modulator input signals, into different direction angle sectors; and from amplitude sample deviations between the different direction angle sectors or from a nominal value are calculated the magnitudes of the distortions in the modulator operation.

The method advantageously also comprises a step wherein the measurement results of the imperfections in the modulator operation are used for adjusting the operation of the modulator by generating feedback loops, which correct all said imperfections simultaneously in an iterative manner.

The invention also relates to method for measuring imperfections in the operation of a digital quadrature demodulator in which an output signal of a quadrature mixer of the demodulator comprises quadrature-phase I and Q channels, whereby from the output signal of the demodulator quadrature mixer are determined, during a normal operation of the demodulator, offset voltages, an imbalance in the amplitudes of the I and Q channels, a quadrature error between the I and Q channels and a total amplitude error. The method comprises the steps in which from the amplitude of the output signal of the demodulator quadrature mixer, i.e. from the amplitude of a vector formed by the I and Q channels, are taken, at a rate based on a symbol clock of the demodulator, numerous momentary samples;

a direction angle of the demodulator output signal vector corresponding to the samples is divided, on the basis of the voltages of the I and Q channels, into different direction angle sectors; and from amplitude sample deviations between the different direction angle sectors or from a nominal value are calculated the magnitudes of the distortions in the demodulator operation.

The method advantageously also comprises a step wherein the measurement results of the imperfections in the demodulator operation are used for adjusting the operation of the demodulator by generating feedback loops, which correct all said imperfections simultaneously in an iterative manner.

The invention is based on the monitoring of the output amplitude of the modulator/demodulator and, above all, on the observation that all the above mentioned imperfections (A, B, C and D) can be measured, using simple inference rules, on an I/Q plane (from what is known as a constellation figure) from a large quantity of momentary samples taken from a modulated signal at a rate based on a symbol clock.

As a solution according to the invention to problem A, DC offsets of the I and Q channels are determined from a difference in the amplitudes of the samples inside two opposite direction angle sectors in relation to a respective axis.

As a solution to problem B, the differences in the signal levels of the I and Q channels are determined on the basis of how much the sum of the amplitudes of the samples of one channel inside two opposite direction angle sectors around a respective axis increases or the decreases in relation to the other channel.

As a solution to problem C, a phase error in a phase difference of 90 degrees in the carrier waves of the I and Q channels is determined on the basis of how much the sum of the amplitudes of the samples inside direction angle sector pairs of opposite directions around one of two axes which are in an angle of 45 degrees to the I and Q axes increases or the reduces in relation to the other axis.

As a solution to problem D, a change in the output power of the modulator/demodulator is determined based on the amplitude of the samples.

In order to simplify the implementation into practice of the method, it is advantageous that the sample group is reduced in such a way that only samples relating to symbols that are known to have the same nominal amplitude are accepted in the calculation.

The invention also relates to a digital quadrature modulator comprising means for modulating quadrature-phase I and Q signals to generate an output signal that comprises quadrature-phase I and Q components. According to the invention, the quadrature modulator is characterized in that the modulator further comprises means for taking momentary amplitude samples from the output signal of the modulator, at.a rate based on the symbol clock of the modulator;

means for classifying a symbol to be modulated at a particular time into a particular direction angle sector;

means for linking the amplitude samples of the output signal to the direction angle sector corresponding to the symbol to be transmitted at a particular time; and means for comparing the amplitudes of the samples belonging to each direction angle sector with other direction angle sectors or with an ideal value, for determining from the output signal of the modulator a local oscillator carder wave leak, an amplitude imbalance between I and Q channels, a quadrature error between the I and Q channels and an amplitude error.

The modulator advantageously further comprises means for correcting the adjusting parameters of the modulator, in response to the predetermined distortions, by forming feedback loops, which correct all said imperfections simultaneously in an iterative manner.

The invention also relates to a digital quadrature demodulator comprising a quadrature mixer for generating analog quadrature-phase I and Q output signals from a quadrature modulated input signal. The demodulator is characterized in that it comprises means for taking momentary samples from the I and Q output signals of the quadrature mixer, at a rate based on a symbol clock of the demodulator;

means for calculating the total amplitude samples of the output signal from the I and Q samples;

means for classifying the direction angle of the symbol received at a particular time to a particular direction angle sector;

means for linking the amplitude samples of the output signal of the quadrature mixer to the corresponding direction angle sector; and means for comparing the amplitudes of the samples belonging to each direction angle sector with the ideal value or other sectors, for simultaneously determining the offset voltages, the amplitude imbalance between the I and Q channels, the quadrature error between the I and Q channels and the total amplitude error in an iterative manner.

The demodulator advantageously further comprises means for correcting the adjusting parameters of the modulator, in a manner depending on the predetermined distortions, by forming feedback loops which correct all said imperfections simultaneously in an iterative manner.

In order to simplify the structure of the modulator or demodulator of the invention, it is advantageous that it further comprises means for selecting the amplitude samples that have the same nominal amplitude.

In an apparatus of the invention all the above mentioned imperfections are continuously detected during the normal operation of the modulator, without any measures by the user being required. In its digital form of implementation, the apparatus of the invention is almost entirely also easy to integrate into the same circuit with other baseband parts of the modulator. After the imperfections have been detected, they can also be automatically and continuously corrected during the normal operation of the modulator.

According to the above, a fundamental discovery of the invention is that the above distortions in constellation can be measured by studying only the momentary amplitude of the output signal of the modulator (transmitter)/demodulator mixer in a manner which depends on the symbol to be transmitted/received. The practical implementation of the method of the invention becomes thus easier and more accurate since it is restricted to cases in which an ideal constellation of the modulation comprises several (>2) points with one and the same amplitude. Such modulations include different versions of PSK (at least 3, i.e. in practice 4 phase modes) and QAM and all constant amplitude modulations (e.g. CPM) generated using a quadrature modulator. In connection with most of the modulations, sampling can be performed at the rate of the symbol clock, although some modulations can require the amplitude to be measured also between the symbol clock periods. In a case of constant amplitude, the non-linearity of the power measurement cannot cause errors in the correction of the imperfections to be performed. If the invention is implemented without such constant amplitude points, an equal accuracy in the correction of thee imperfections is not achieved.

BRIEF DESCRIPTION OF THE DRAWINGS

The invention will now be described in greater detail only in theory, by means of embodiments based on the study of constellation points of a constant amplitude and partly with reference to the enclosed drawings, in which.

DETAILED DESCRIPTION OF THE INVENTION

In a preferred embodiment of the invention, in which the study is restricted to constellation points with a nominally constant amplitude, values of different distortions can be concluded from the amplitude in question as follows:

A. The measurement of DC offsets requires that the points to be measured are close to the I and Q axes in the constellation (particularly well suited for e.g. 8 PSK, 16 QAM, pi/4-QPSK and TFM modulations, in which the maximum distance of the constellation points from the axes is 22.5%; it also functions in a QPSK modulation, in which the maximum distance of the constellation points from the axes is 45°). The offset of the I channel can be found out by measuring output amplitudes from the symbols with constellation points close to the positive I axis and by subtracting (an equal number of) the output amplitudes from them, said amplitudes corresponding to the symbols with constellation points close to thee negative I axis. The shorter the distance to the axes, the more accurate the following formulas are. The offset of the Q channel is measured correspondingly. Thus:

$$dUI=(A0-A4)*K1$$

$$dUQ=(A2-A6)*K1$$

wherein dUI=I signal offset dUQ=Q signal offset

An=average of the output amplitudes, measured for constellation points that are close to a semi-axis (a positive or a negative half) number n. The axes are numbered anticlockwise from the positive I axis at intervals of 45 degrees (n=0, . . . , 7).

Km=a scaling coefficient depending on the realisation of the apparatus.

The offset could also be measured, instead of the difference in the approximately opposite amplitudes, by comparing separate amplitudes with a nominal one, only then the end result comprises also a considerable amount of impact from other imperfections and the proportion of the offset cannot be separated.

B. The measurement of the difference in the signal levels of the I and Q channels requires that there are points to be measured close to the I and Q axes in the constellation, as above (thus particularly well suited for such modulations as 8 PSK, 16 QAM, pi/4-QPSK and TFM, in which the maximum distance of the constellation points from the axes is 22.5°).

$$AI-AQ=(A0+A4-A2-A6)*K2$$

wherein AI−AQ=the amplitude difference between the I and: Q signals (effective, taking also into account responses of the modulator mixers and the like).

The impact of other imperfections is again cancelled to a great extent in this formula.

C. The measurement of the quadrature error (the error dΘ in the angle of 90 degrees between the I and Q axes) requires that there are points to be measured in the constellation close to axes that are in an angle of +−45 degrees to the I axis. Such modulations include all the above, i.e. also the normal QPSK.

$$Adis=(A1+A5-A3-A7)/4$$

$$d\Theta=2*(\arccos((Adis/Anom+1)/\sqrt{2})-45 \text{ deg.})$$

wherein Adis=average amplitude distortion Anom=nominal amplitude

Figure 1:
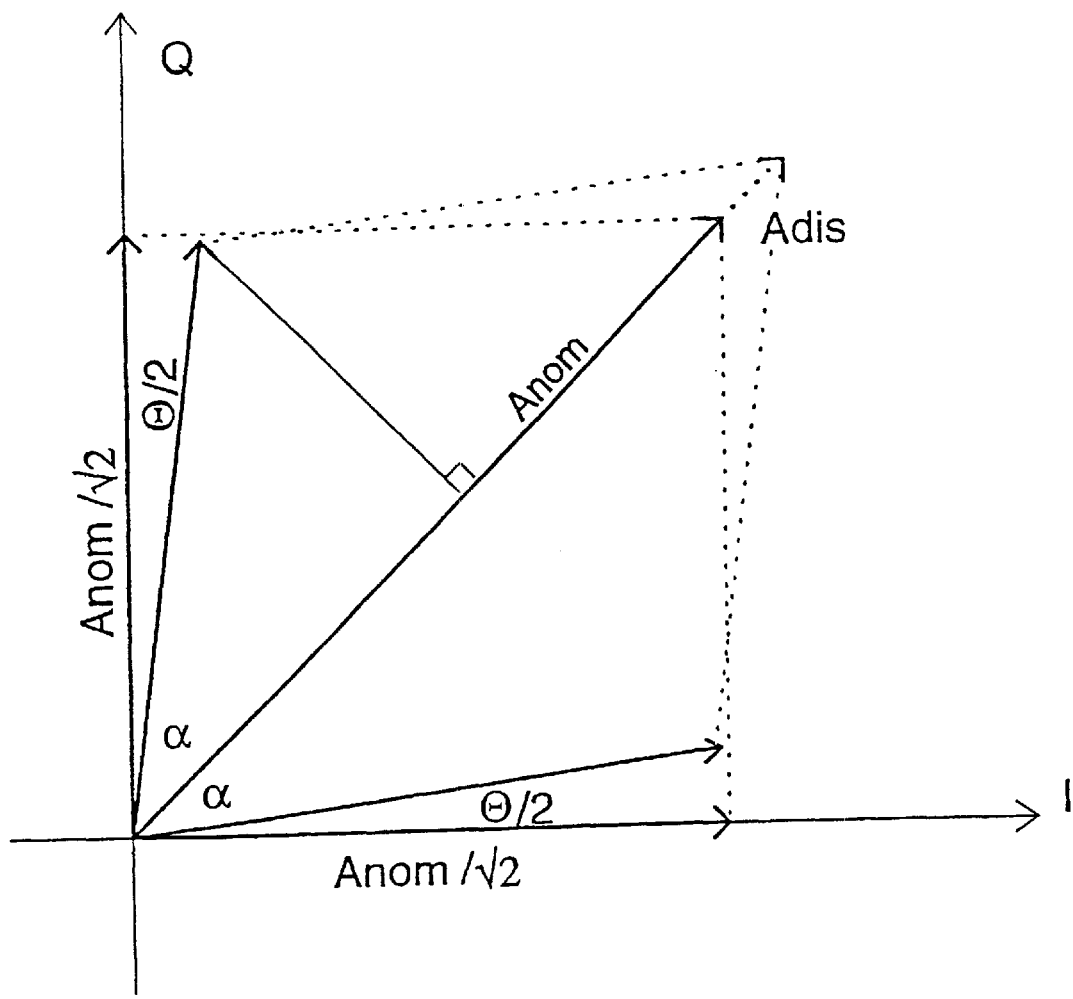
FIG. 1 illustrates a determining of a quadrature error.

The above calculation formulas are illustrated in FIG. 1. The formula for the angle dΘ only provides an approximate result due to averaging being performed prior to the calculation of the angle. An approximation is, however, very accurate in connection with minor angle errors.

D. The error of the output amplitude of the modulator (transmitter) is obtained by a comparison of the average of all measured constellation points with the nominal amplitude. This allows implementing a rather conventional ALC function, a special characteristic of which is that the measurement is performed from the constellation points and not as a root-mean-square or a maximum value.

$$Aerr=(A0+A1+A2+A3+A4+A5+A6+A7)/8-Anom$$

wherein Aerr=output amplitude distortion from the desired

In all the above cases it is beneficial to average the result over numerous measurement results, whereby errors due to other imperfections and noise can be significantly reduced. From the point of view of implementation, the nominal amplitude is advantageously subtracted immediately after the sampling and the averaging is only performed over the differences thus obtained. When the measurement data is used for controlling members which correct the imperfections via a suitable feedback amplifier, a most accurate adjustment is achieved.

Figure 2:
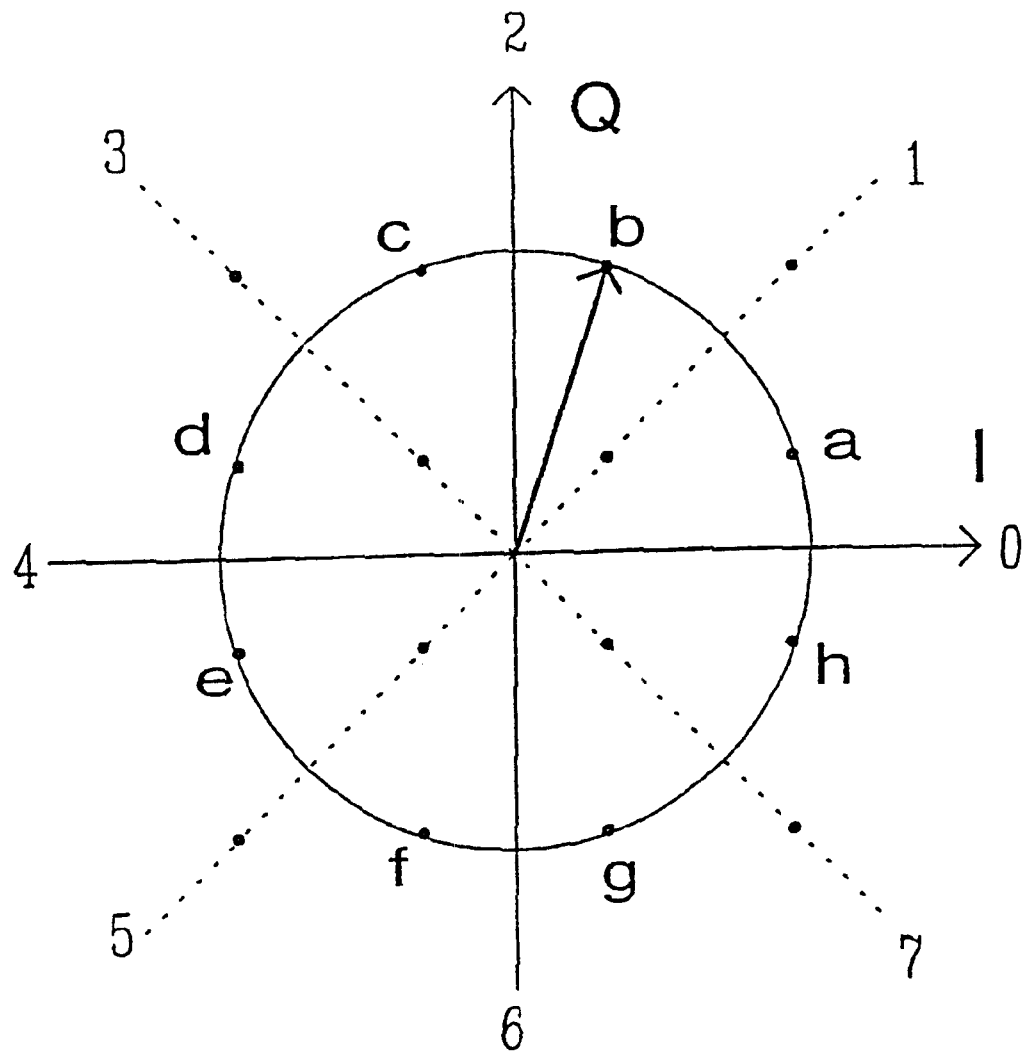
FIG. 2 illustrates a 16 QAM constellation.

FIG. 2 shows a 16 QAM constellation comprising said axes indicated by numbers 0, . . . , 7. The constant amplitude points to be used are indicated with characters a, . . . , h. It is observed that there are always two constellation points in pairs equally close to each semi-axis. Both of the points are made use of when the imperfections defined above under items A, B, C and D are calculated by applying the following formulas (An now being the amplitude of point n):

$$dUI=(Ah+Aa-Ad-Ae)/2*K1$$

$$dUQ=(Ab+Ac-Af-Ag)2*K1$$

$$AI-AQ=(Ah+Aa-Ad-Ae-Ab-Ac+Af+Ag)/2*K2$$

$$Adis=(Aa+Ab-Ae-Af-Ac-Ad+Ag+Ah)/8$$

$$d\Theta 2*(\arccos((Adis/Anom+1)/\sqrt{2})-45 \text{ deg.})$$

$$Aerr=(Aa+Ab+Ac+Ad+Ae+Af+Ag+Ah)/8-Anom$$

The data on the modulator imperfections generated by the above methods are fed, when desired, through the feedback members to adjust the modulator in such a way that the imperfections are minimised. The data can also be utilized by performing in connection with implementation testing a single-type correction for which the apparatus is placed in a suitable testing bench, which determines the imperfections and either performs an automated correction of settings or it is left to the tester. The procedure does not, however, allow taking into account the imperfections emerging when the apparatus is in use, which an embodiment comprising correcting feedback members is able to accomplish. For the invention to function well, it is required that all the above mentioned imperfections (A, B, C, D) are corrected simultaneously, because crosstalk occurs to some extent between the measurement results of different imperfections.

Figure 3:
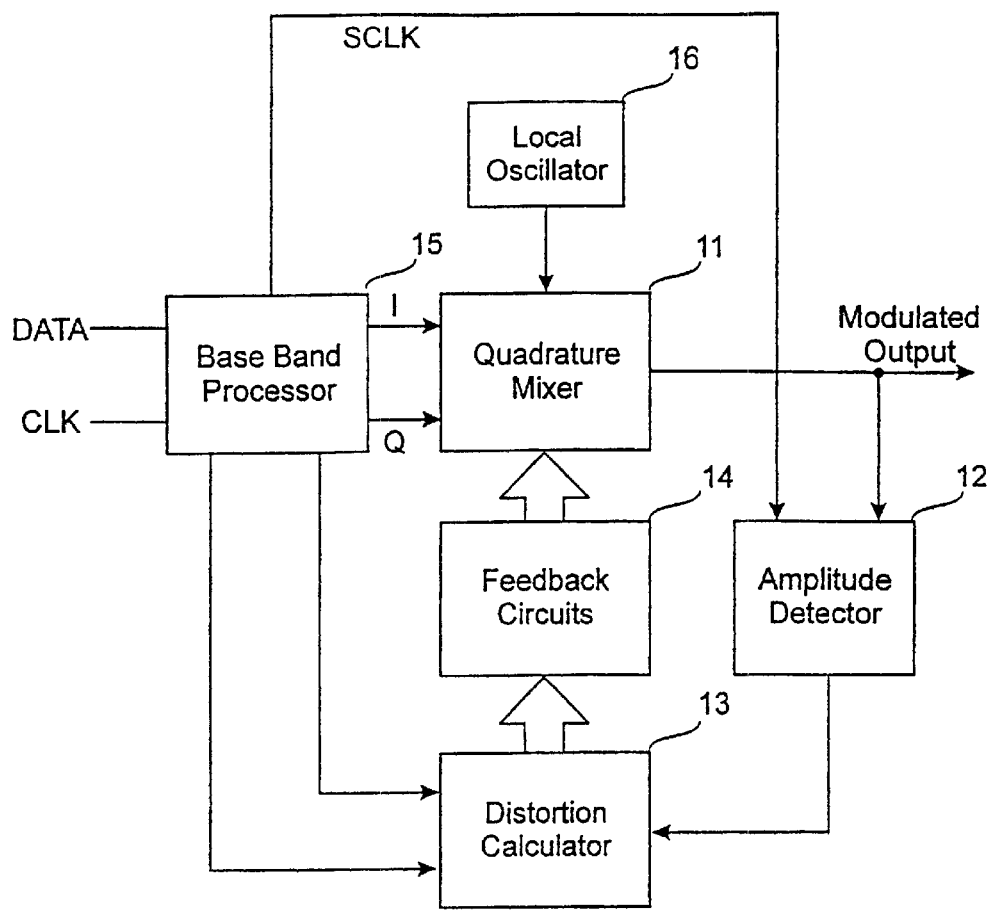
FIG. 3 shows a rough block diagram of a quadrature modulator comprising a compensation of imperfections according to the invention.

FIG. 3 shows a rough block diagram of a quadrature modulator comprising also a compensation of imperfections according to invention. Reference number 15 indicates a baseband processor, which receives as inputs digital data and a bit-frequency clock CLK and delivers as outputs analog I and Q signals and a symbol clock SCLK. Reference number 11 indicates a mixer, the adjusting parameters of which can be digitally arranged. The mixer receives as inputs I and Q signals and a carrier wave signal from a local oscillator 16. The output of the mixer is a quadrature modulated output signal. An amplitude detector 12 is used for taking from the output signal of the mixer 11 samples, at a rate based on a symbol clock SCLK, said samples being collected to a distortion calculator 13. The distortion calculator 13 receives as inputs also either analog or digital quadrature-phase I and Q signals generated by the baseband processor. On the basis of the I and Q signals the distortion calculator 13 selects from the samples it receives from the amplitude detector the desired ones, i.e. in practice most preferably the ones which should have the same nominal amplitude. Using the calculation formulas defined above, the distortion calculator 13 calculates, from the selected samples, values for different distortions A, B, C and D. On the basis of the calculation results, feedback circuits 14 provide such corrections for the adjusting parameters of the quadrature modulator 11 that any imperfections occurring in the operation of the modulator are corrected.

A principle according to the invention allows the above mentioned imperfections to be most effectively compensated in a continuous manner during the normal operation of the modulator, without any adjustments being needed even at the production stage. As stated above, a method of the invention for defining imperfections could also be used for performing such adjustments, whereby a continuous feedback, and thus circuit 14, could possibly be disposed of.

An advantage of the invention is a most repeatable and advantageous implementation using digital signal processing. Any adjustments are not needed either, but the correction of the imperfections is fully automated. In connection with high transmission capacities, inconvenience can arise from how to have the time of measurement sufficiently accurately set and from the fact that at the modulator (transmitter) output, constellation points are not yet in their exact place in all systems. The reason for this is that the receiver part of a total filtering is not included. Both situations can be improved, if necessary, by selecting from the signal routes to (and from) a desired constellation point only those that are best for the operation of the system. This allows reducing the impact the symbols have on each other. On the other hand, usually extensive averaging already provides a sufficiently good result.

The invention can be implemented in different ways, depending on the applied modulation and on the choice of the constellation points to be measured. Also the measurement of the output amplitude and data processing can be performed using different, technologies. The invention is most advantageously implemented as a part of a modem modulator based on digital signal processing.

The most advantageous method of realising the equipment is to use, as extensively as possible, a digital implementation integrated into the same microcircuit with other digital parts of the modulator.

The signal obtained from the measurement of the output amplitude is immediately converted into a digital signal of one or more bits using an AD converter that is clocked by the symbol clock SCLK (or its multiple). At the same time the nominal value of the amplitude is subtracted from the measurement result. Each adjustment parameter of the modulator is corresponded to by a register (an accumulator). The obtained measurement result is summed either directly or in an inverted form into the registers in the adjustment parameter formulas corresponding to which the amplitude of said constellation point appears (the point being known on the basis of the data to be transmitted). The registers thus function as integrating members for adjustment feedback, and the values they include control the modulator after scaling. The quadrature error formula $$d\Theta = 2*(\arccos((Adis/Anom+1)/\sqrt{2}) - 45 \text{ deg.})$$

can be replaced by an approximation formula $$d\Theta = Adis * K3$$

The amount of digital logic needed is reduced by the fact that the A/D conversion of the output power measurement can be performed using one bit (=a simple comparator), when the ALC function of the modulator (the transmitter) is implemented as shown in connection with the calculation of the error D above. The level of comparison of the comparator is then arranged to correspond to the desired amplitude and the ALC feedback ensures that, in a balance situation, approximately an equal number of ones and zeros are obtained at the desired constellation points. One stands for an amplitude which is too high and zero for an amplitude which is too low.

A one and the same microcircuit circuit can also comprise circuits modifying the I and Q signals on the basis of the detected signals of the invention in such a way that the modulator imperfections are compensated and almost an ideal output signal is obtained as a result. Offsets can be corrected by summing the correcting DC voltages to the I and Q signals. An amplitude balance and an output amplitude can be corrected by changing the amplitudes of the I and Q signals. A quadrature error can be corrected by causing controlled crosstalk between the I and Q signals. All said measures and their control operations can be performed digitally, so the whole equipment (the modulator and the detection and adjustment circuits) can be integrated to provide a very small and advantageous entity.

Quadrature correction could also be performed analogically by feeding a DA converted adjustment voltage into an electronically controlled phase shifter.

Figure 4:
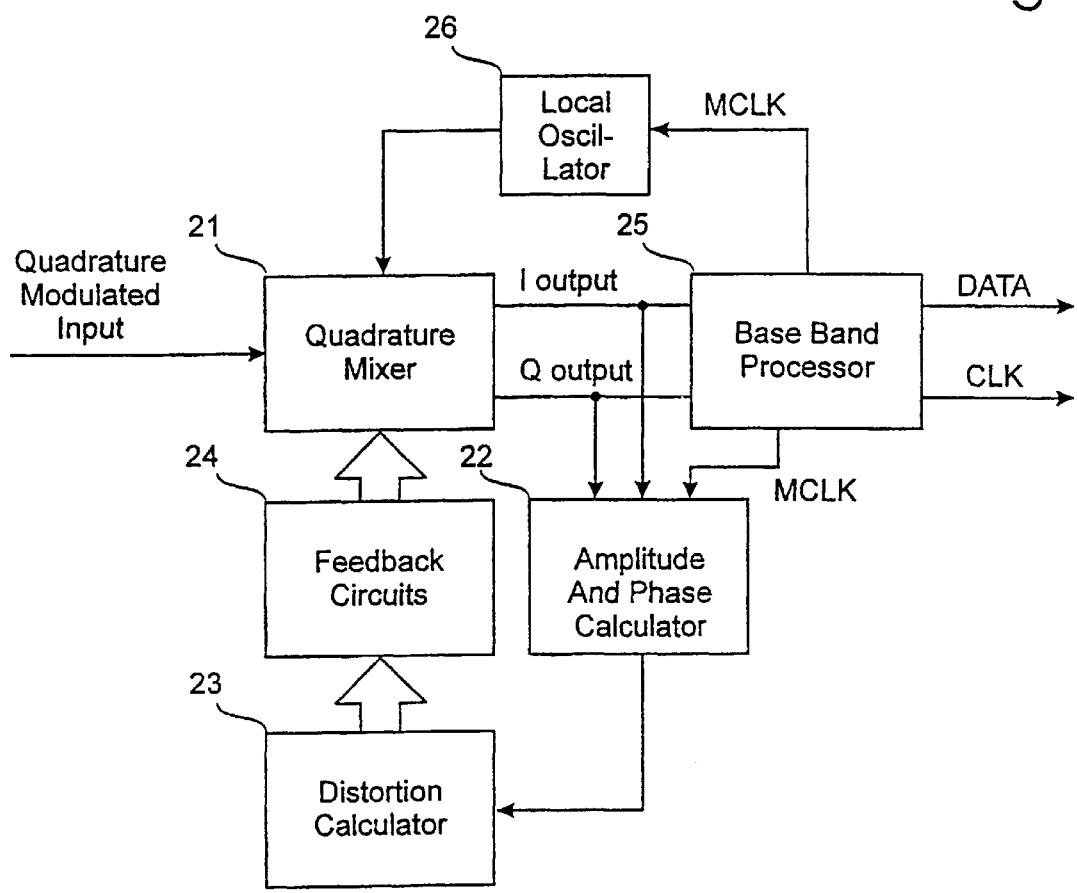
FIG. 4 shows a rough block diagram of a quadrature demodulator comprising a compensation of imperfections according to the invention.

The invention is described above only in connection with a quadrature modulator, but as already stated above, the invention is also suited to be used at a reception end, i.e. in connection with a quadrature demodulator. The quadrature demodulator is illustrated in FIG. 4 in which to the mixer of the quadrature demodulator is fed both a quadrature modulated, signal and a carrier wave received from a local oscillator 26, whereby a mixer 21 produces analog quadrature-phase I and Q signals as outputs. A circuit 22 is used for taking from the signals amplitude samples at the rate based on a clock MCLK obtained from a baseband processor 25, the total amplitude samples being defined from said samples. The direction angle of a symbol received at a particular time is then classified into a direction angle sector and each total amplitude sample is linked to a corresponding direction angle sector. To the total amplitude samples linked to the direction angle can now be applied calculation formulas given above for defining different distortion types A, . . . , D. Said defining is performed in a distortion calculator 23. In practice the calculation should be made by using only samples representing symbols with a nominally constant amplitude. The symbol concerned at a particular time does not need to be decided, as long as the amplitude measured from the output signals of the mixer 21 is of an approximately correct level.

The imperfections in the operation of the mixer 21 having been determined according to the invention in the circuit 23, the mixer settings are corrected using feedback circuits 24 in such a way that the detected distortions are corrected.

According to the above, the basic discovery of the invention relating to the use of the shape and size of the constellation figure for determining operational imperfections can be applied both in the quadrature modulator and in the quadrature demodulator. The above described embodiments provide, however, very rough illustrations and the practical implementations can vary from the illustrations without deviating from the scope of protection defined by the enclosed claims. It is then also to be noted that instead of analog or digital circuit structures, significant parts of the described circuits can also be implemented by means of software, i.e. by using a suitably programmed processor to perform desired operations or to generate desired structures.

What is claimed is:

1. A method for measuring imperfections in a digital quadrature modulator operation in which an input signal of the modulator includes quadrature-phase I and Q channels, the method comprising:

taking a plurality of momentary samples from an amplitude of an output signal at a rate based on a symbol clock of the modulator, the number of the plurality of samples being reduced by accepting for calculation only samples relating to symbols that are known to have a same nominal amplitude;

dividing a direction angle of a transmission signal corresponding to the plurality of samples into different direction angle sectors based on data bits to be transmitted or modulator input signals;

calculating magnitudes of distortions in the modulator operation from amplitude sample deviations between the different direction angle sectors or from a nominal value; and using the calculated distortion magnitudes to adjust the operation of the modulator by generating feedback loops, which correct for all the distortions in the modulator operation simultaneously in an iterative manner.

2. A method for measuring imperfections in the operation of a digital quadrature demodulator when an output signal of a quadrature mixer of the demodulator includes quadrature-phase I and Q channels, the method comprising:

taking a plurality of momentary samples from an amplitude of a vector formed by the I and Q channels at a rate based on a symbol clock of the demodulator, the number of the plurality of momentary samples being reduced by accepting for calculation only samples relating to symbols that are known to have a same nominal amplitude;

dividing a direction angle of the demodulator output signal vector corresponding to the samples into different direction angle sectors based on voltages of the I and Q channels;

calculating magnitudes of distortions in the demodulator operation from amplitude sample deviations between the different direction angle sectors or from a nominal value; and using the calculated distortion magnitudes to adjust the operation of the demodulator by generating feedback loops, which correct for all the distortions in the demodulator operation simultaneously in an iterative manner.

3. The method of claim 1 or 2, further comprising determining DC offsets of the I and Q channels from a difference in the amplitudes of the samples inside two opposite direction angle sectors around a respective axis.

4. The method of claim 1 or 2, wherein the differences in the signal levels of the I and Q channels are determined based on how much a sum of the amplitudes of the samples of one channel inside two opposite direction angle sectors around a respective axis increases or decreases in relation to the other channel.

5. The method of claim 1 or 2, further comprising determining a phase error in a phase difference of 90 degrees between the carrier waves of the I and Q channels based on how much a sum of the amplitudes of the samples of one channel inside direction angle sector pairs of opposite directions around one of two axes which are in an angle of 45 degrees to the I and Q axes increases or decreases in relation to the other axis.

6. The method of claim 1 or 2, wherein a change in the output power of the modulator/demodulator is defined based on the amplitude of the samples.

7. A digital quadrature modulator including means for modulating quadrature-phase I and Q input signals to generate an output signal including quadrature-phase I and Q components and means for taking momentary amplitude samples from the output signal of the modulator at a rate based on a symbol clock of the modulator, the modulator further comprising:

means for selecting for calculation amplitude samples that have a same nominal amplitude, means for classifying a symbol to be modulated at a particular time into a particular direction angle sector;

means for linking the selected amplitude samples to the direction angle sector corresponding to the symbol to be transmitted at a particular time;

means for comparing amplitudes of the samples belonging to a particular direction angle sector with other direction angle sectors or with an ideal value, to determine, from the output signal of the modulator, operation distortions including at least one of a local oscillator carrier wave leak, an amplitude imbalance between I and Q channels, a quadrature error between the I and Q channels and an amplitude error; and means for correcting adjusting parameters of the modulator in response to the operation distortions by generating feedback loops, which correct for all the operation distortions simultaneously in a iterative manner.

* * * * *